(12) United States Patent
Min et al.

(10) Patent No.: US 9,094,948 B1
(45) Date of Patent: Jul. 28, 2015

(54) METHOD, MOBILE TERMINAL, ACCESSORY APPARATUS AND COMPUTER-READABLE RECORDING MEDIUM FOR PROVIDING ACCESSORY PROTOCOL SUPPORTING MULTI-CONNECTIONS

(71) Applicant: Obigo Inc., Gyeonggi-do (KR)

(72) Inventors: Kyeong Oh Min, Gyeonggi-do (KR); Seung Bok Ryu, Seoul (KR)

(73) Assignee: Obigo Inc., Gyeonggi-do (KR)

( * ) Notice: Subject to any disclaimer, the term of this patent is extended or adjusted under 35 U.S.C. 154(b) by 0 days.

(21) Appl. No.: 14/580,195

(22) Filed: Dec. 22, 2014

(51) Int. Cl.
*H04M 1/04* (2006.01)
*H04W 76/02* (2009.01)
*H04M 1/725* (2006.01)

(52) U.S. Cl.
CPC ........ *H04W 76/021* (2013.01); *H04M 1/72527* (2013.01)

(58) Field of Classification Search
CPC ............ H04W 88/02; H04L 29/08657; H04L 29/08072; H04L 29/06; H04L 63/0428

USPC ......... 455/557, 456.3; 709/224, 230; 713/150
See application file for complete search history.

(56) References Cited

U.S. PATENT DOCUMENTS

| | | | |
|---|---|---|---|
| 2009/0037594 A1* | 2/2009 | Sever et al. | 709/230 |
| 2009/0119502 A1* | 5/2009 | Ziv et al. | 713/150 |
| 2014/0075015 A1* | 3/2014 | Chan et al. | 709/224 |

* cited by examiner

*Primary Examiner* — Phuoc H Doan
(74) *Attorney, Agent, or Firm* — Husch Blackwell LLP

(57) ABSTRACT

A mobile terminal includes: a communication port; and a processor; wherein the processor establishes a basic connection between the mobile terminal and an accessory apparatus which use an accessory protocol through the communication port, and wherein the processor allows each of multiple applications executed or executable on the mobile terminal to perform communications with the accessory apparatus by referring to session information corresponding to each of the applications. Thus, multiple applications running on the mobile terminal can communicate with the accessory apparatus simultaneously by using the accessory protocol.

20 Claims, 8 Drawing Sheets

METHOD, MOBILE TERMINAL, ACCESSORY APPARATUS AND COMPUTER-READABLE RECORDING MEDIUM FOR PROVIDING ACCESSORY PROTOCOL SUPPORTING MULTI-CONNECTIONS

FIELD OF THE INVENTION

The present invention relates to a method, a mobile terminal, an accessory apparatus, and a computer-readable recording medium for providing an accessory protocol supporting multi-connections; and more particularly, to the method, the mobile terminal, the accessory apparatus, and the computer-readable recording medium for allowing multi-connections by providing a port number for each of the connections between the mobile terminal and the accessory apparatus which use the accessory protocol.

BACKGROUND OF THE INVENTION

As mobile terminals including smartphones have been widely used, their hardware and software have been continuously developed for a variety of additional functions in addition to a communication function.

The mobile terminals may interact with a variety of other devices as well as base stations. For example, the mobile terminals may interact with an accessory apparatus, i.e., an apparatus for providing a service(s) to the mobile terminals after being connected with it through a Universal Serial Bus ("USB") and so forth. In particular, the Android operating system provides an accessory protocol (or the Android open accessory protocol) to allow the communication with the accessory apparatus. An Android device with the Android operating system may communicate with the accessory apparatus through the accessory protocol.

However, the accessory protocol supports only a one-to-one communication with a single communication channel. In other words, the problem is that only one Android application may communicate with an accessory apparatus at a time during communication between a mobile terminal and the accessory apparatus. Under multitasking environment, it may be necessary for multiple applications on an Android device to communicate with external devices at the same time but the accessory protocol cannot support such communications. For example, if services using the accessory apparatus are provided through multiple apps, only one application of them can use a connection between the mobile terminal and the accessory apparatus.

Korean Laid-Open Publication No. 10-2011-7024283 and so forth in relation to the communication between a mobile terminal and an accessory apparatus have been disclosed, but they do not suggest any solution regarding the above-mentioned problems.

Therefore, the inventor of the present invention came to develop the technology of allowing multiple applications to communicate simultaneously between a mobile terminal and an accessory apparatus by providing multiple channels which use an accessory protocol and distinguishable by port number.

SUMMARY OF THE INVENTION

It is an object of the present invention to solve all the problems mentioned above.

It is another object of the present invention to allow multi-connections between a mobile terminal and an accessory apparatus by using an accessory protocol capable of providing only a one-to-one communication.

In accordance with one aspect of the present invention, there is provided a mobile terminal, including: a communication port; and a processor; wherein the processor establishes a basic connection between the mobile terminal and an accessory apparatus which use an accessory protocol through the communication port, and wherein the processor allows each of multiple applications executed or executable on the mobile terminal to perform communications with the accessory apparatus by referring to session information corresponding to each of the applications.

In accordance with another aspect of the present invention, there is provided a method for a mobile terminal to communicate with an accessory apparatus, including steps of: (a) the mobile terminal to establish a basic connection between itself and the accessory apparatus which use an accessory protocol through its communication port; and (b) the mobile terminal allowing each of multiple applications executed or executable thereon to perform communications with the accessory apparatus by referring to session information corresponding to each of the applications.

In accordance with still another aspect of the present invention, there is provided an accessory apparatus, including: a communication port; and a processor; wherein the processor establishes a basic connection between a mobile terminal and the accessory apparatus which use an accessory protocol through the communication port, and wherein the processor allows each of multiple templates executed or executable on the accessory apparatus to perform communications with the mobile terminal by referring to session information corresponding to each of the templates.

In accordance with still yet another aspect of the present invention, there is provided a method for an accessory apparatus to communicate with a mobile terminal, including steps of: (a) the accessory apparatus to establish a basic connection between the mobile terminal and itself which use an accessory protocol through its communication port; and (b) the accessory apparatus allowing each of multiple templates executed or executable thereon to perform communications with the mobile terminal by referring to session information corresponding to each of the templates.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
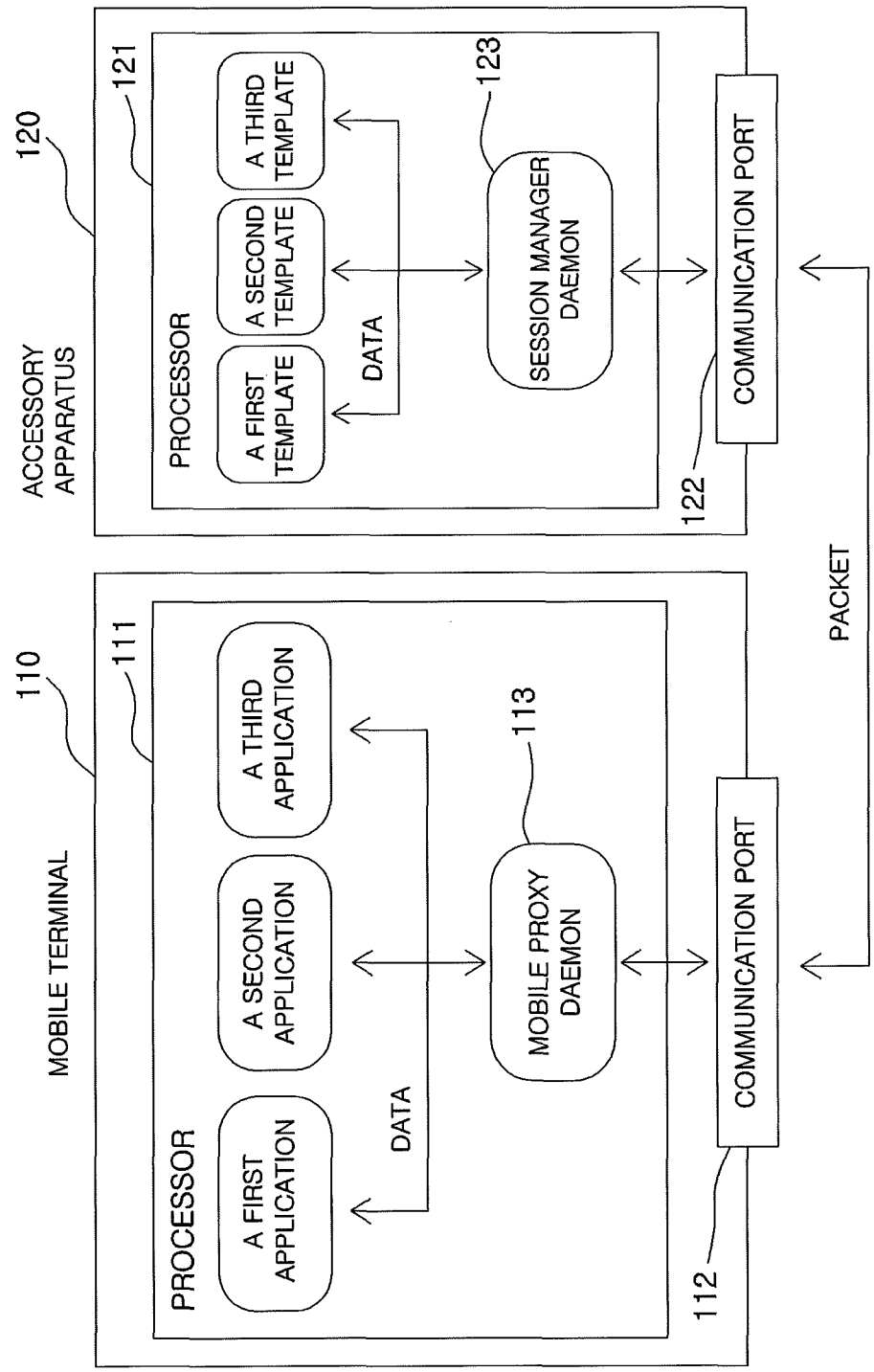
FIG. 1 is a drawing exemplarily showing a configuration of a whole system to support communications between a mobile terminal and an accessory apparatus by using an accessory protocol which supports multi-connections in accordance with the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Configuration of Whole System

FIG. 1 is a drawing exemplarily showing a configuration of a whole system to support communications between a mobile terminal and an accessory apparatus by using an accessory protocol which supports multi-connections in accordance with the present invention.

As illustrated in FIG. 1, the whole system of the present invention may include a mobile terminal 110 and an accessory apparatus 120.

First of all, in accordance with one example embodiment of the present invention, the mobile terminal 110 may include a processor 111 and a communication port 112 while the accessory apparatus 120 may include a processor 121 and a communication port 122. The communication port 112 of the mobile terminal 110 and the communication port 122 of the accessory apparatus 120 may include USB port.

In accordance with one example embodiment of the present invention, the processor 111 of the mobile terminal 110 may set up a connection between the mobile terminal 110 and the accessory apparatus 120 through the communication port 112. Besides, the processor 121 of the accessory apparatus 120 may set up the connection therebetween through the communication port 122. Herein, for the connection, an accessory protocol may be used.

Next, in accordance with one example embodiment of the present invention, the mobile terminal 110 may execute one or more applications and the accessory apparatus 120 may execute one or more templates. The applications may include a variety of applications being executed on the mobile terminal 110 such as a music player, a navigation system, and a weather information app. The accessory apparatus 120 may be a head unit and the templates may be various user interfaces on a connection for providing Human Machine Interfaces (HMI) for the applications on the mobile terminal 110. The templates may be installed on the accessory apparatus 120 in a variety of forms depending on forms of the applications and may be provided in installable forms through downloading, etc. depending on communication specifications.

In accordance with one example embodiment of the present invention, the mobile terminal 110 and the accessory apparatus 120 may provide a multi-channel function to make multiple applications and multiple templates communicate with each other simultaneously. The multi-channel function may be realized by assigning corresponding session information to each pair of application and template. For instance, the session information corresponding to each pair of application and template may include a port number given by pair of application and template. The processor 111 of the mobile terminal 110 may allow a communication with the accessory apparatus 120 through the set-up connection of a specific application by using a port number allocated to the specific application and the processor 121 of the accessory apparatus 120 may allow a communication with the mobile terminal 110 through the set-up connection of a specific template by using a port number allocated to the specific template.

In accordance with one example embodiment of the present invention, a packet transmitted or received between the mobile terminal 110 and the accessory apparatus 120 may include the session information corresponding to the app-template pair. Herein, the session information may include a port number allocated to the app-template pair or information indicating the port number. For example, the mobile terminal 110 and the processor 111 may inform the accessory apparatus 120 of information on a specific application which has transmitted a packet or identify a certain application whose packet will be transmitted among applications which are being, or can be, executed on the mobile terminal 110 by providing a corresponding port number in the packet to the accessory apparatus 120. In addition, the processor 121 of the accessory apparatus 120 may inform the accessory apparatus 120 of information on a specific template which has transmitted a packet or identify a certain template whose packet will be transmitted among templates which are being, or can be, executed on the accessory apparatus 120 by providing a corresponding port number in the packet to the accessory apparatus 120.

For example, a specific application being executed on the mobile terminal 110 may transmit a packet to the accessory apparatus 120 through the communication port 112 and the processor 111 of the mobile terminal 110 may add a port number allocated to the specific application to the packet transmitted thereto. If the packet transmitted from the mobile terminal 110 through the communication port 122 includes the port number allocated to a specific template, the processor 121 of the accessory apparatus 120 may transmit the transmitted packet to the specific template corresponding to the port number. Besides, the specific template executed on the accessory apparatus 120 may transmit a packet to the mobile terminal 110 through the communication port 122 and the processor 121 of the accessory apparatus 120 may add the port number allocated to the specific template to the packet transmitted thereto.

In accordance with one example embodiment of the present invention, multiple applications may be executed by the processor 111 of the mobile terminal 110 and each application may communicate with each corresponding template among multiple templates being executed on the accessory apparatus 120 by referring to each port number allocated to each application. Additionally, multiple templates may be executed by the processor 121 of the accessory apparatus 120 and each template may communicate with each corresponding application among multiple applications being executed on the mobile terminal 110 by referring to each port number allocated to each template. Herein, each application and each corresponding template may mean an application-template pair which may interact with each other through communications to provide various services to a user.

In accordance with one example embodiment of the present invention, the processor 111 of the mobile terminal 110 and the processor 121 of the accessory apparatus 120 may execute daemons respectively to provide the multi-channel function. The daemon which provides the multi-channel function will be explained below.

In accordance with one example embodiment of the present invention, the processor 111 of the mobile terminal 110 may execute one or more applications and a mobile proxy daemon 113. In FIG. 1, a first, a second, and a third applications are illustrated as examples. Each application may communicate with the mobile proxy daemon 113. Communications between the applications and the mobile proxy daemon 113 may be made through a local Inter Process Communication (IPC). Each of the applications may transmit data to the accessory apparatus 120 through the mobile proxy daemon 113 and receive the data from the accessory apparatus 120.

In accordance with one example embodiment of the present invention, the processor 121 of the accessory apparatus 120 also may execute one or more templates and a session manager daemon 123. In FIG. 1, a first, a second, and a third templates are illustrated as examples. Each of the templates may communicate with the session manager daemon 123. Communications between the templates and the session manager daemon 123 may be made through the local IPC. Each of the templates may transmit data to the mobile terminal 110 through the session manager daemon 123 and receive the data from the mobile terminal 110.

For example, in case of the communications between the mobile terminal 110 and the accessory apparatus 120, the mobile proxy daemon 113 may perform a multiplexing function of receiving data from one of multiple applications being executed on the mobile terminal 110 and transmitting the received data to the accessory apparatus 120 and the session manager daemon 123 may perform a demultiplexing function of distributing the data received from the mobile terminal 110 to one appropriate template among multiple templates being executed on the accessory apparatus 120. When the mobile proxy daemon 113 creates a packet so as to include the data transmitted from a specific application, the mobile proxy daemon 113 may include a port number allocated to the specific application which transmitted the data in the packet. Herein, a concept of the port number may be generalized as a term of "session information" which will be described later. When the session manager daemon 123 selects a specific template to which the data of the packet is transmitted, the session manager daemon 123 may refer to information on the port number included in the packet.

Example Embodiment to Provide Multi-channel

Figure 2:
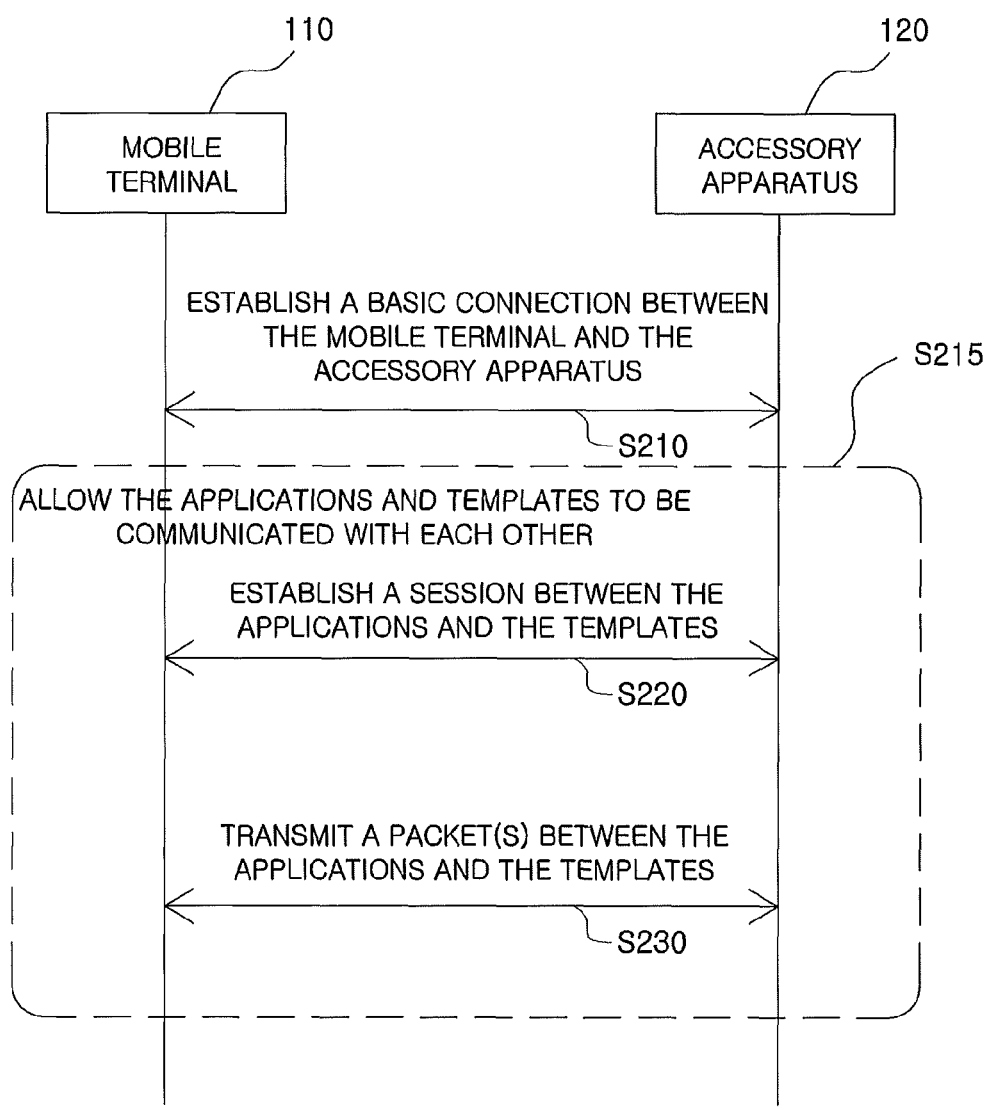
FIG. 2 is a flowchart of a method for communications between the mobile terminal and the accessory apparatus in accordance with one example embodiment of the present invention.

FIG. 2 is a flowchart of a method for communications between the mobile terminal and the accessory apparatus in accordance with one example embodiment of the present invention.

(i) First of all, in accordance with one example embodiment of the present invention, a basic connection between the mobile terminal 110 and the accessory apparatus 120 may be set up at a step of S210. The mobile terminal 110 may set up the basic connection between the mobile terminal 110 and the accessory apparatus 120 with an accessory protocol through its communication port 112. In addition, the accessory apparatus 120 may set up the basic connection therebetween with the accessory protocol through its communication port 122. Herein, the basic connection between the mobile terminal 110 and the accessory apparatus 120 may be made by a physical connection therebetween and it may be a basis on connections between the applications being executed on the mobile terminal 110 and the templates on the accessory apparatus 120.

The setup of the connection between the mobile terminal 110 and the accessory apparatus 120 in accordance with one example embodiment of the present invention will be explained in more details later by referring to FIG. 5 below.

(ii) Next, in accordance with one example embodiment of the present invention, the processor 111 of the mobile terminal 110 and the processor 121 of the accessory apparatus 120 may allow the applications in the mobile terminal 110 and the templates in the accessory apparatus 120 to be communicated with each other at a step of S215.

In accordance with one example embodiment of the present invention, the processor 111 of the mobile terminal 110 may support each of the applications, which are, or can be, executed on the mobile terminal 110, to communicate with the accessory apparatus 120 by using session information corresponding to each of them. The processor 111 may support each of the applications to communicate with each corresponding template among multiple templates which are executed on the accessory apparatus 120 by referring to session information corresponding to each application. The processor 111 may add the session information corresponding to a specific application among the multiple applications to a packet transmitted to the accessory apparatus 120 through the communication port 112. Further, the processor 111 may transmit a packet from the accessory apparatus 120 to the specific application through the communication port 112 if the packet has the session information corresponding to the specific application.

Moreover, in accordance with one example embodiment of the present invention, the processor 121 of the accessory apparatus 120 may support each of the templates, which are, or can be, executed on the accessory apparatus 120, to communicate with the mobile terminal 110 by using the session information corresponding to each of them. The processor 121 may support each of the templates to communicate with each corresponding application among multiple applications which are executed on the mobile terminal 110 by referring to session information corresponding to each template. The processor 121 may add the session information corresponding to a specific template among the multiple templates to a packet transmitted to the mobile terminal 110 through the communication port 122. Further, the processor 121 may transmit a packet from the mobile terminal 110 to the specific template through the communication port 122 if the packet has the session information corresponding to the specific template.

In accordance with one example embodiment of the present invention, the session information given to the applications and the templates may include a port number(s) or information on the port number(s).

For the communications between the applications and the templates, the following steps S220 and S230 may be executed. The step S215 may include the steps S220 and S230.

(ii-1) First of all, a session between the applications and the templates may be set up at a step of S220.

For the session setup, the mobile terminal 110 may allocate a port number to a specific application being executed on the mobile terminal 110 and the accessory apparatus 120 may allocate a port number to a specific template executed on the accessory apparatus 120.

In accordance with one example embodiment of the present invention, the mobile terminal 110 and the accessory apparatus 120 may allocate the same port number to the specific application and the specific template, respectively, which correspond to each other. For example, if the specific template is executed, the processor 121 of the accessory apparatus 120 may allocate a specific port number to the executed specific template and also may transmit to the mobile terminal 110 a request for the execution of the specific application to be connected with the executed specific template, and the specific port number to be allocated to the specific application. Besides, the processor 111 of the mobile terminal 110 may receive from the accessory apparatus 120 (i) the request for the execution of the specific application to be connected with the specific template executed on the accessory apparatus 120 and (ii) information on the specific port number to be allocated to the specific application. Then, the processor 111 may execute the specific application so as to be connected to the specific template of the accessory apparatus 120 if the specific port number is available.

The setup of the session between the specific application and the specific template in accordance with one example embodiment of the present invention will be explained in more details later by referring to FIG. 6.

(ii-2) Thereafter, the specific application and the specific template may transmit a packet(s) with each other by using the specific port numbers at a step of S230. The mobile terminal 110 may transmit data to the accessory apparatus 120 through the set-up connection by using the specific port number allocated to the specific application and the accessory apparatus 120 may transmit data to the mobile terminal 110 through the set-up connection by using the specific port number allocated to the specific template.

The data transmission between the specific application and the specific template in accordance with one example embodiment of the present invention will be explained in more details later by referring to FIG. 7.

Figure 3:
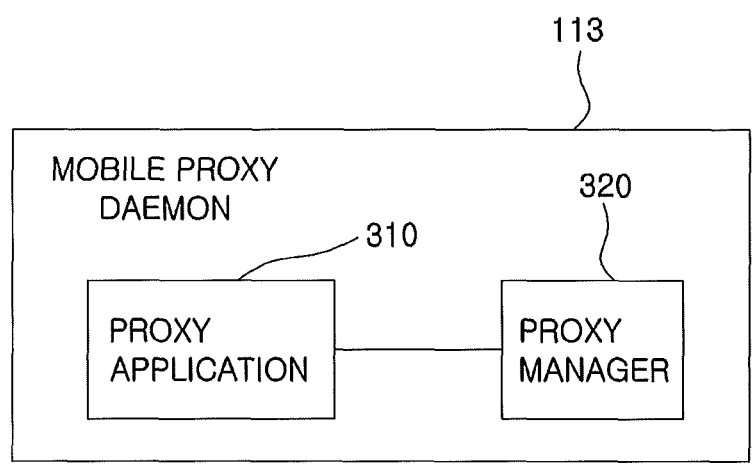
FIG. 3 illustrates a configuration of a mobile proxy daemon in accordance with one example embodiment of the present invention.

FIG. 3 illustrates a configuration of a mobile proxy daemon in accordance with one example embodiment of the present invention.

The mobile proxy daemon 113 as illustrated by referring to FIG. 1 may include a proxy application 310 and a proxy manager 320. In other words, the processor 111 of the mobile terminal 110 may include the proxy application 310 and the proxy manager 320.

In accordance with one example embodiment of the present invention, the proxy application 310 may search and execute one or more applications compatible with one of the templates of the accessory apparatus 120 among all applications installed in the mobile terminal 110. If the accessory apparatus 120 requests execution of a specific application, i.e., one of the applications, compatible with a specific template, i.e., one of the templates, information on a specific port number to be used by the specific template and the specific application may be transmitted to the proxy manager 320 and if the use of the specific port number by the proxy manager 320 is approved, the approved specific port number may be transmitted to the specific application.

In accordance with one example embodiment of the present invention, the proxy manager 320 may manage resource requested for the session setup. For example, if a specific port is requested by the proxy application 310, the proxy manager 320 may check whether the requested specific port is available and then allow the specific port (or its specific port number) to be used by the specific application depending on the result of the check. In addition, the proxy manager 320 may allow the mobile terminal 110 to be communicated with the accessory apparatus 120. The proxy manager 320 may create a packet by using data transmitted from the specific application among all the applications which can be interacted with the accessory apparatus 120. When the packet is created, the proxy manager 320 may insert the session information into the packet. The session information may include, or correspond to, the port number allocated to the specific application. For instance, if the mobile terminal 110 and the accessory apparatus 120 use multiple pieces of session information, each piece of session information may correspond to each port number. Thus, each corresponding port number may be allowed to be identified through the corresponding session information. The proxy manager 320 may transmit the packet to the accessory apparatus 120 through the communication port 112. Furthermore, it may control sessions between the applications and the templates.

Figure 4:
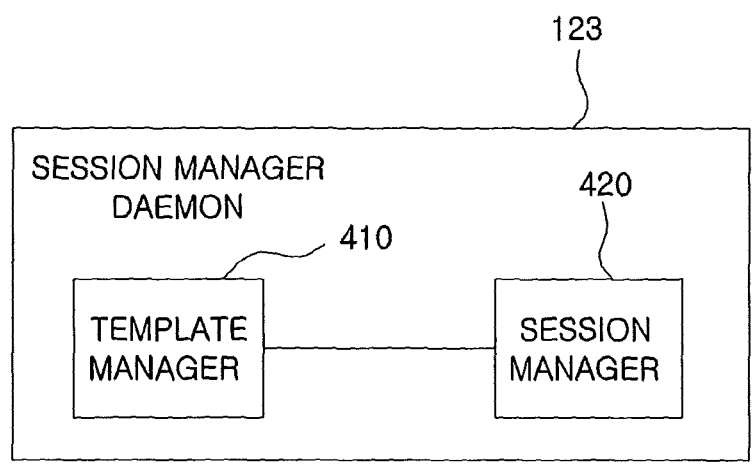
FIG. 4 shows a configuration of a session manager daemon in accordance with one example embodiment of the present invention.

FIG. 4 shows a configuration of a session manager daemon in accordance with one example embodiment of the present invention.

By referring to FIG. 1, the above-mentioned session manager daemon 123 may include a template manager 410 and a session manager 420. In other words, the processor 121 of the accessory apparatus 120 may include the template manager 410 and the session manager 420.

In accordance with one example embodiment of the present invention, the template manager 410 may manage a life cycle of the templates and provide control information to the mobile terminal 110 for the communications between the templates and the mobile terminal 110.

In accordance with one example embodiment of the present invention, the session manager 420 may identify a specific port number included in a packet transmitted from the mobile terminal 110 by referring to session information included in the packet. The session manager 420 may transmit data of the packet to a specific template which the specific port number is allocated to. The session manager 420 may control connection and disconnection of sessions and add or delete resource related to the sessions for multi-sessions.

In the explanation by referring to FIGS. 5 to 7 as shown below, the processor 111 of the mobile terminal 110 may execute the operating system of the mobile terminal 110 and the processor 121 of the accessory apparatus 120 may execute the operating system thereof. Functions explained below to be performed by the operating system of the mobile terminal 110 may be carried out by the processor 111 and those explained below to be performed by the operating system of the accessory apparatus 120 may be conducted by the processor 121.

Figure 5:
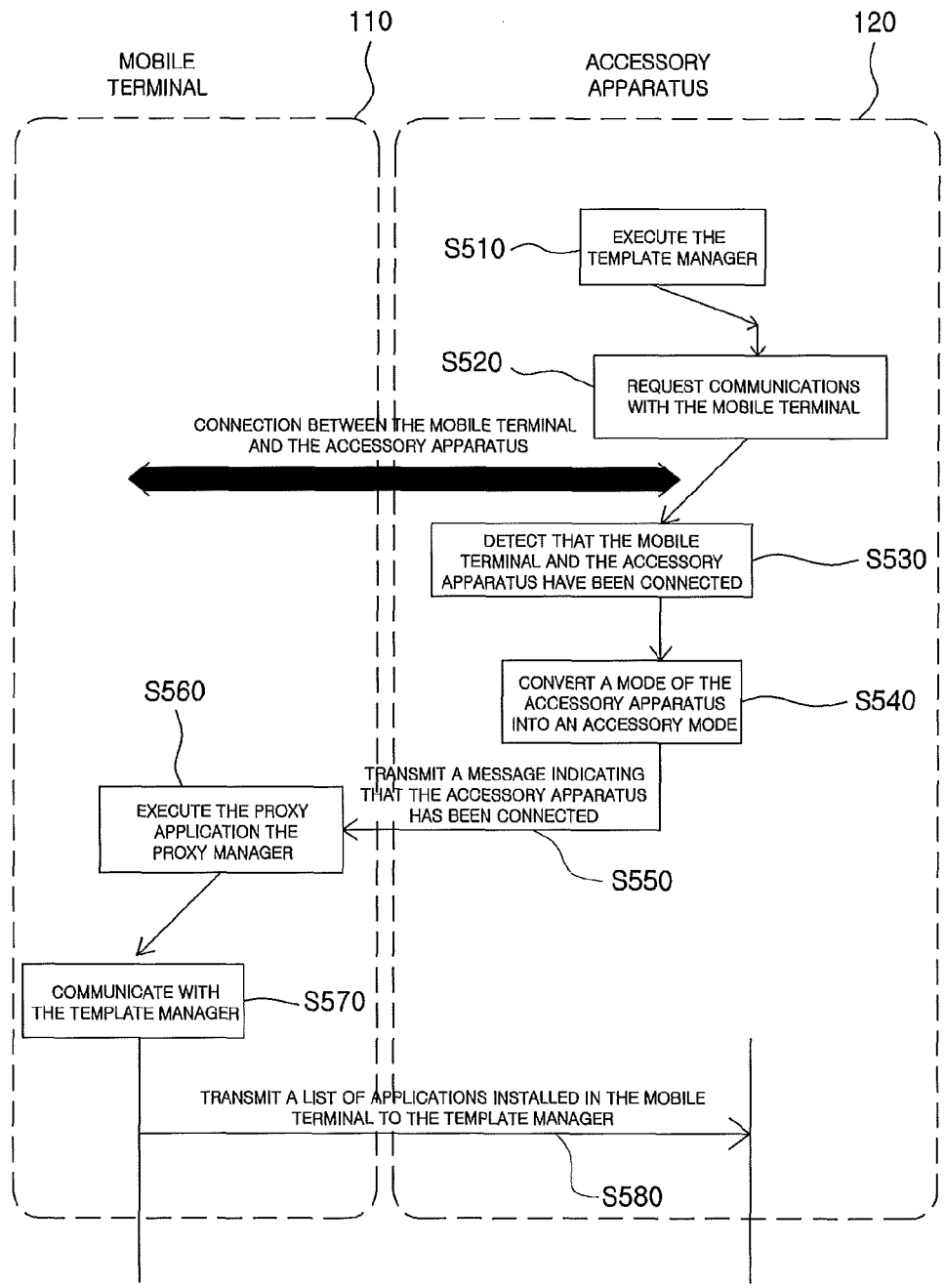
FIG. 5 is a flowchart of connection setup between the mobile terminal and the accessory apparatus in accordance with one example embodiment of the present invention.

FIG. 5 is a flowchart of connection setup between the mobile terminal and the accessory apparatus in accordance with one example embodiment of the present invention.

The step S210 described above by referring to FIG. 2 may include the following steps S510 to S580:

(i) First of all, in accordance with one example embodiment of the present invention, the operating system of the accessory apparatus 120 may execute the template manager 410 at a step of S510.

(ii) Next, in accordance with one example embodiment of the present invention, the executed template manager 410 may request communications with the mobile terminal 110 through a port corresponding to a port number predefined by the operating system of the accessory apparatus 120 at a step of S520. The template manager 410 may open the port of the predefined port number, and stand by for a connection with the mobile terminal 110.

(iii) And then, in accordance with one example embodiment of the present invention, the operating system of the accessory apparatus 120 may detect that the mobile terminal 110 and the accessory apparatus 120 have been physically connected at a step of S530. For example, the operating system of the accessory apparatus 120 may detect that the communication port 112 of the mobile terminal 110 and the communication port 122 of the accessory apparatus 120 have been connected with each other through a cable. Herein, the physical connection between the mobile terminal 110 and the accessory apparatus 120 may be a basic connection as a basis on the setup of the connection between the applications and the templates.

(iv) Besides, in accordance with one example embodiment of the present invention, if the connection between the mobile terminal 110 and the accessory apparatus 120 is detected, the operating system of the accessory apparatus 120 may convert a mode corresponding to the accessory apparatus 120 into a so-called accessory mode working as an accessory apparatus of the mobile terminal 110 at a step of S540.

(v) Then, in accordance with one example embodiment of the present invention, the operating system of the accessory apparatus 120 may transmit a connection message which indicates that the accessory apparatus 120 has been connected to the mobile terminal 110 at a step of S550.

(vi) After that, in accordance with one example embodiment of the present invention, if the mobile terminal 110 receives the connection message from the accessory apparatus 120, the operating system of the mobile terminal 110 may execute the proxy application 310 and the proxy manager 320 at a step of S560.

(vii) In accordance with one example embodiment of the present invention, the proxy application 310 may communicate with the template manager 410 through the predefined port number at a step of S570.

(viii) Next, in accordance with one example embodiment of the present invention, if the proxy application 310 and the template manager 410 are connected, the proxy application 310 may transmit a list of applications installed in the mobile terminal 110 to the template manager 410 through the predefined port number at a step of S580.

As described above, in accordance with one example embodiment of the present invention, if the template manager 410 of the accessory apparatus 120 requests the setup of the basic connection to the mobile terminal 110 through the predefined port and then transmits to the mobile terminal 110 that the accessory apparatus 120 has been connected, the proxy application 310 and the proxy manager 320 may be run. Then, the proxy application 310 may try to set up the basic connection with the template manager 410 through the predefined port. If the basic connection is made, the proxy application 310 may send the list of applications installed in the mobile terminal 110 through the predefined port to the accessory apparatus 120 and support at least one of applications in the list to be selected by the accessory apparatus 120.

In accordance with one example embodiment of the present invention, the template manager 410 may request the communications for the basic connection to the mobile terminal 110 through the predefined port and transmit to the mobile terminal 110 that the accessory apparatus 120 has been connected. When the template manager 410 transmits to the mobile terminal 110 that the accessory apparatus 120 has been connected and then the proxy application 310 and the proxy manager 320 of the mobile terminal 110 are run, the template manager 410 may try to set up the basic connection with the proxy application 310 through the predefined port. If the basic connection is made, the template manager 410 may receive the list of applications installed in the mobile terminal 110 through the predefined port from the mobile terminal 110 and then support at least one of applications in the list to be selected by the accessory apparatus 120.

Figure 6:
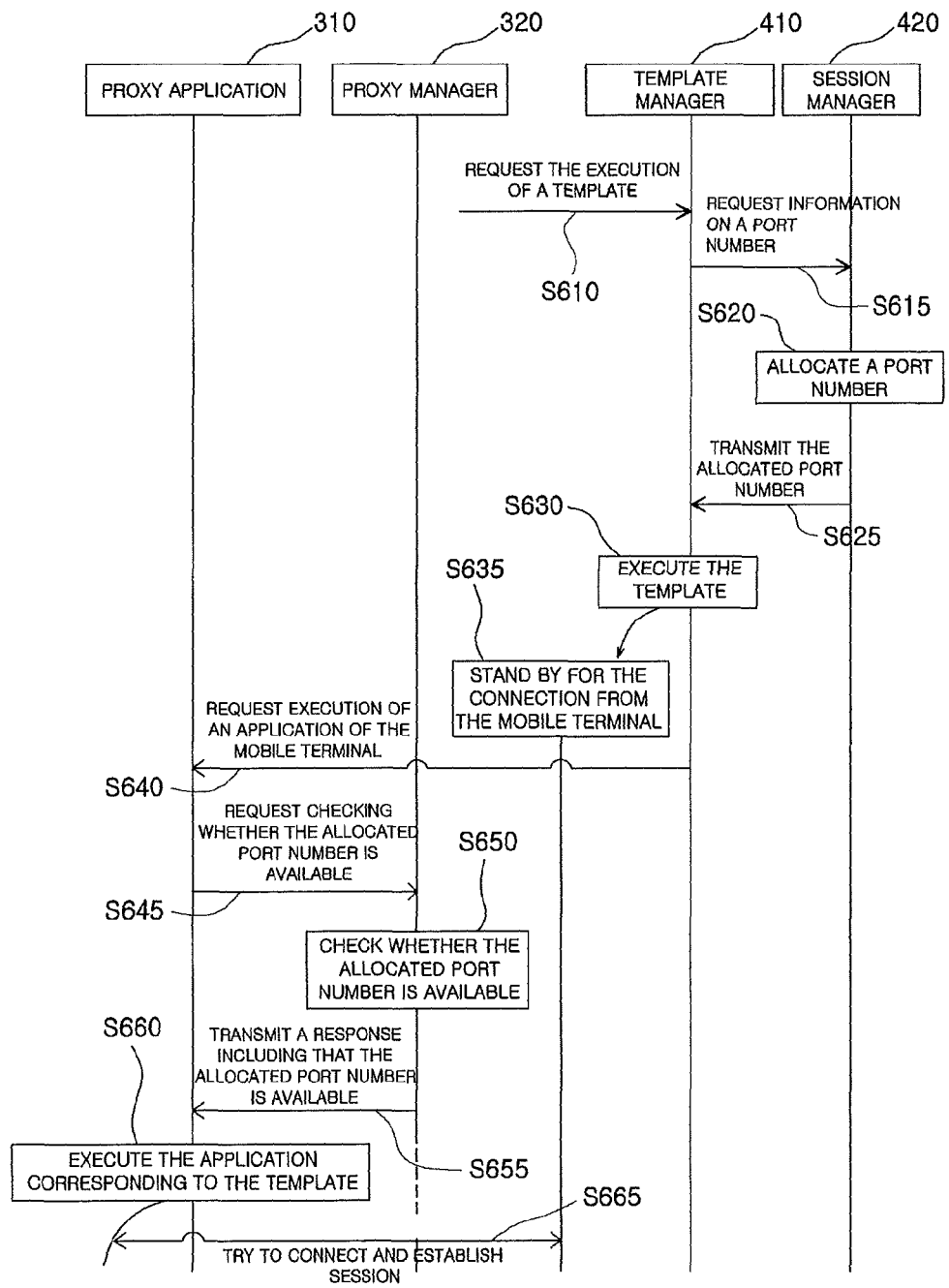
FIG. 6 is a flowchart of session setup between an application and a template in accordance with one example embodiment of the present invention.

FIG. 6 is a flowchart of session setup between an application and a template in accordance with one example embodiment of the present invention.

The pre-described step S220 by referring to FIG. 2 may include the following steps S610 through S665:

(i) First of all, in accordance with one example embodiment of the present invention, the template manager 410 may receive a request for execution of a new template from a user or the operating system of the accessory apparatus 120 at a step of S610.

(ii) After that, in accordance with one example embodiment of the present invention, the template manager 410 may request information on a port number of a port to be allocated to the new template to the session manager 420 to create a session for the new template at a step of S615.

(iii) Then, in accordance with one example embodiment of the present invention, the session manager 420 may allocate one of available port numbers to the new template to be executed at a step of S620.

(iv) In accordance with one example embodiment of the present invention, the session manager 420 may transmit the allocated port number to the template manager 410 at a step of S625.

(v) Next, in accordance with one example embodiment of the present invention, the template manager 410 may execute the new template and provide the port number allocated to the new template at a step of S630. For example, when the new template is executed, the template manager 410 may use the allocated port number as a factor of executing the new template. Otherwise, the template manager 410 may transmit the port number to the new template after the new template is executed.

(vi) In accordance with one example embodiment of the present invention, the new template may open the allocated port and stand by for the connection from the mobile terminal 110 at a step of S635.

(vii) After that, in accordance with one example embodiment of the present invention, the template manager 410 may transmit a request for execution of an application of the mobile terminal 110 to be connected with the executed new template to the proxy application 310 at a step of S640. The template manager 410 may transmit the information on the port number allocated to the new template with the request for the execution of the application to the proxy application 310. Otherwise, the request for the execution of the application may include the information on the port number allocated to the new template.

(viii) Then, in accordance with one example embodiment of the present invention, the proxy application 310 may transmit the request for checking whether the allocated port number is available or not to the proxy manager 320. In other words, the proxy application 310 may request the proxy manager 320 to check whether the port number allocated to the new template can be used for the connection with the corresponding application in the mobile terminal 110 at a step of S645.

(ix) In accordance with one example embodiment of the present invention, the proxy manager 320 may check whether the allocated port number is available for the connection with the corresponding application in the mobile terminal 110 at a step of S650.

(x) Next, in accordance with one example embodiment of the present invention, if the allocated port number is available, the proxy manager 320 may transmit a response showing that the allocated port number is available to the proxy application 310 at a step of S655.

(xi) In accordance with one example embodiment of the present invention, the proxy application 310 may execute the application corresponding to the new template and provide the port number allocated to the application at a step of S660. For instance, when the application is executed, the proxy application 310 may use the allocated port number as a factor of executing the application. Or the proxy application 310 may transmit the information on the port number to the application after the new template is executed.

(xii) Next, in accordance with one example embodiment of the present invention, the application may try to connect with the new template through the allocated port at a step of S665. When the connection is established, the new template and the application may set up a new session.

In other words, as described above, after the template manager 410 of the accessory apparatus 120 requests an available port to the session manager 420 of the accessory apparatus 120 to make a new session, if the session manager 420 allocates a specific port and the template manager 410 executes a specific template connected through the specific port and then requests the proxy application 310 to execute a specific application to be connected with the specific template, the proxy application 310 may execute the requested specific application and the executed specific application may set up a new session to be connected with the specific template through the specific port. In addition, if the proxy application 310 asks the proxy manager 320 whether the specific port is available and then if it is confirmed by the proxy manager 320 that it is available, the proxy application 310 may execute the requested specific application and the executed specific application may set up a new session so as to be connected with the specific template through the specific port.

In accordance with one example embodiment of the present invention, if the template manager 410 requests an available port to make a new session to the session manager 420, the session manager 420 may allocate the specific port. The template manager 410 may execute the specific template connected through the specific port and request the proxy application 310 of the mobile terminal 110 to execute the specific application to be connected with the specific template. If the specific application requested by the proxy application 310 is executed, the specific template may set up a new session to be connected with the executed specific application through the specific port.

Whenever a request for the execution of a new template is received, the above-stated steps S610 through S665 may be repeatedly performed. In other words, when multiple applications and multiple templates are executed in the mobile terminal 110 and the accessory apparatus 120, the steps S610 through S665 may be performed by each application-template pair to thereby achieve the multi-sessions. In short, when the aforementioned explanation is rendered down, it can be said that while a first session, i.e., the basic connection, between the proxy application 310 and the template manager 410 is maintained, one or more second sessions between one or more applications and one or more templates are established.

Figure 7:
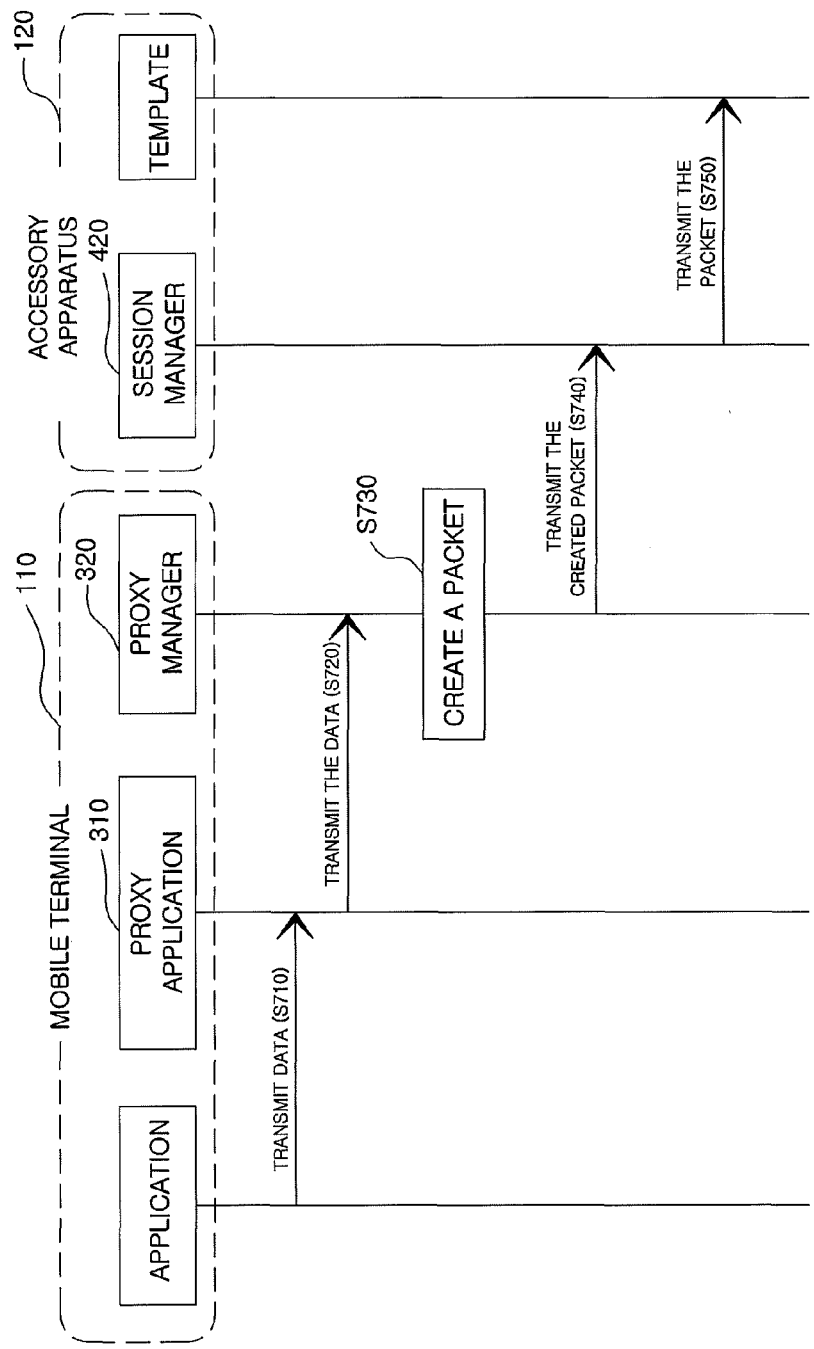
FIG. 7 is a flowchart explaining data transmission between the application and the template in accordance with one example embodiment of the present invention.

FIG. 7 is a flowchart explaining data transmission between the application and the template in accordance with one example embodiment of the present invention.

The step S230 as mentioned by referring to FIG. 2 may include the following steps S710 through S750:

(i) First of all, in accordance with one example embodiment of the present invention, if a session between a specific template and a specific application is established, the specific application may transmit data to the proxy application 310 through the local IPC at a step of S710. The specific application may transmit the allocated port number together with the data. Or while receiving the data from the specific application, the proxy application 310 may identify a specific port number allocated to the specific application transmitting the data.

(ii) Next, in accordance with one example embodiment of the present invention, the proxy application 310 may transmit the data sent from the specific application to the proxy manager 320 at a step of S720.

(iii) And then, in accordance with one example embodiment of the present invention, the proxy manager 320 may create a packet by using the allocated specific port number and the data at a step of S730. The proxy manager 320 may create a session control header by using the information on the port number. For example, the session control header may include the information on the port number. The packet may include the session control header and the data.

The configuration of the packet in accordance with one example embodiment of the present invention is explained later in more details by referring to FIG. 8.

(iv) Next, in accordance with one example embodiment of the present invention, the proxy manager 320 may transmit the created packet to the session manager 420 at a step of S740.

(v) After that, in accordance with one example embodiment of the present invention, the session manager 420 which has received the packet may transmit the packet to the specific template which the specific port number is allocated to by referring to the specific port number or the session control header in the packet at a step of S750. The session manager 420 may remove parts unnecessary, for the specific template, including the specific session control header from the packet and transmit, to the specific template, the packet whose unnecessary parts are removed.

In accordance with one example embodiment of the present invention, if data are transmitted from the specific template to the specific application, operations opposite to what are explained at the steps S710 through S750 may be performed. For instance, the specific template may transmit the data to the template manager 410 through the local IPC and the session manager 420 which receives the data from the template manager 410 may create a packet including a specific port number or a specific session control header and transmit the created packet to the proxy manager 320. The proxy manager 320 may transmit the packet to the specific application to which the specific port number is allocated by referring to the specific port number or the specific session control header in the packet.

Figure 8:
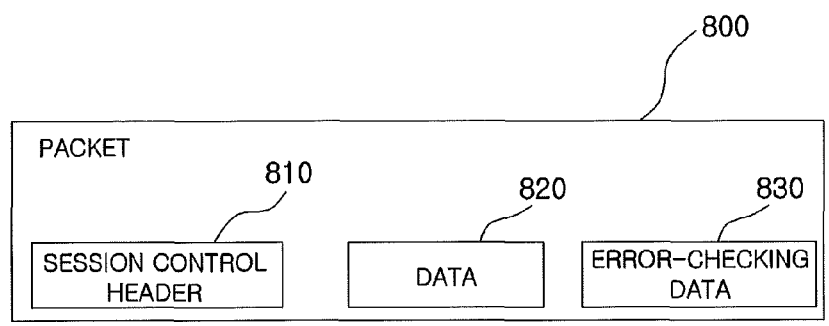
FIG. 8 shows a configuration of a packet in accordance with one example embodiment of the present invention.

FIG. 8 shows a configuration of a packet in accordance with one example embodiment of the present invention.

In accordance with one example embodiment of the present invention, a packet 800 which is transmitted through a connection between the mobile terminal 110 and the accessory apparatus 120 may include a session control header 810, data 820 and error-checking data 830.

In accordance with one example embodiment of the present invention, the session control header 810 may be data used to identify a port number. For example, the session control header 810 may be data which include, or correspond to, the port number.

In accordance with one example embodiment of the present invention, the data 820 may be information created by an application and transmitted to a template or information created by a template and transmitted to an application for the communications between the application and the template.

In accordance with one example embodiment of the present invention, the error-checking data 830 may be checksum or parity data as data used for packet integrity.

In accordance with the present invention, multiple applications running on the mobile terminal can communicate with the accessory apparatus simultaneously.

In accordance with the present invention, a service through the communications with the accessory apparatus may be provided through the multiple applications and a specific application which provides a special function among all services may be easily developed, set up, added, and removed.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A mobile terminal, comprising:
a communication port; and
a processor;
wherein the processor establishes a basic connection between the mobile terminal and an accessory apparatus which use an accessory protocol through the communication port, and wherein the processor allows each of multiple applications executed or executable on the mobile terminal to perform communications with the accessory apparatus by referring to session information corresponding to each of the applications; and
wherein the processor adds session information corresponding to a specific application among the multiple applications to a first packet to be transmitted from the specific application to the accessory apparatus and transmits a second packet received from the accessory apparatus to the specific application if the second packet has session information corresponding to the specific application.

2. The mobile terminal of claim 1, wherein the processor allows each of the multiple applications to communicate with each template selected among multiple templates executed on the accessory apparatus by referring to each piece of the session information.

3. A mobile terminal, comprising:
a communication port; and
a processor;
wherein the processor establishes a basic connection between the mobile terminal and an accessory apparatus which use an accessory protocol through the communication port, and wherein the processor allows each of multiple applications executed or executable on the mobile terminal to perform communications with the accessory apparatus by referring to session information corresponding to each of the applications;
wherein the processor includes a proxy application and a proxy manager, and
wherein, after (i) a session manager of the accessory apparatus allocates a predetermined port if a template manager of the accessory apparatus requests an available port to the session manager thereof to make a new session, and (ii) the template manager thereof executes a specific template connected to the predetermined port and requests the proxy application to execute a specific application to be connected with the specific template, the proxy application executes the requested specific application and establishes the new session for allowing the executed specific application to be connected with the specific template through the predetermined port.

4. The mobile terminal of claim 3, wherein, after (i) the session manager of the accessory apparatus allocates the predetermined port if the template manager of the accessory apparatus requests the available port to the session manager thereof to make the new session, and (ii) the template manager thereof executes the specific template connected to the predetermined port and requests the proxy application to execute the specific application to be connected with the specific template, the proxy application executes the requested specific application and establishes the new session for allowing the executed specific application to be connected with the specific template through the predetermined port after the proxy application asks the proxy manager whether the predetermined port is available and then receives a reply from the proxy manager that it is available.

5. A mobile terminal, comprising:
a communication port; and
a processor;
wherein the processor establishes a basic connection between the mobile terminal and an accessory apparatus which use an accessory protocol through the communication port, and wherein the processor allows each of multiple applications executed or executable on the mobile terminal to perform communications with the accessory apparatus by referring to session information corresponding to each of the applications;
wherein the processor includes a proxy application and a proxy manager, and
wherein, after the template manager of the accessory apparatus requests the communications for the basic connection to the mobile terminal through a predetermined port and then transmits to the mobile terminal a fact that the accessory apparatus has been connected thereto, the proxy application tries to communicate with the template manager for the basic connection therebetween through the predetermined port and sends a list of applications to the accessory apparatus through the predetermined port on the basis of the basic connection to thereby support at least one of the applications in the list to be selected by the accessory apparatus.

6. A mobile terminal, comprising:
a communication port; and
a processor;
wherein the processor establishes a basic connection between the mobile terminal and an accessory apparatus which use an accessory protocol through the communication port, and wherein the processor allows each of multiple applications executed or executable on the mobile terminal to perform communications with the accessory apparatus by referring to session information corresponding to each of the applications; and
wherein the processor receives a request for execution of a specific application to be connected with a specific template executed on the accessory apparatus and information on a specific port number allocated to the specific application to be connected from the accessory apparatus and then executes the specific application if the specific port number is available.

7. A method for a mobile terminal to communicate with an accessory apparatus, comprising steps of:
(a) the mobile terminal to establish a basic connection between itself and the accessory apparatus which use an accessory protocol through its communication port; and
(b) the mobile terminal allowing each of multiple applications executed or executable thereon to perform communications with the accessory apparatus by referring to session information corresponding to each of the applications; and
wherein, at the step of (b), session information corresponding to a specific application among the multiple applications is added to a first packet to be transmitted from the specific application to the accessory apparatus and a second packet received from the accessory apparatus is transmitted to the specific application if the second packet has session information corresponding to the specific application.

8. The method of claim 7, wherein, at the step of (b), each of the multiple applications is allowed to communicate with each template selected among multiple templates executed on the accessory apparatus by referring to each piece of the session information.

9. A method for a mobile terminal to communicate with an accessory apparatus, comprising steps of:
(a) the mobile terminal to establish a basic connection between itself and the accessory apparatus which use an accessory protocol through its communication port; and
(b) the mobile terminal allowing each of multiple applications executed or executable thereon to perform communications with the accessory apparatus by referring to session information corresponding to each of the applications;
wherein the mobile terminal includes a proxy application and a proxy manager, and
wherein, at the step of (b), after (i) a session manager of the accessory apparatus allocates a predetermined port if a template manager of the accessory apparatus requests an available port to the session manager thereof to make a new session, and (ii) the template manager thereof executes a specific template connected to the predetermined port and requests the proxy application to execute a specific application to be connected with the specific template, the proxy application executes the requested specific application and establishes the new session for allowing the executed specific application to be connected with the specific template through the predetermined port.

10. The method of claim 9, wherein, at the step of (b), after (i) a session manager of the accessory apparatus allocates a predetermined port if a template manager of the accessory apparatus requests an available port to the session manager thereof to make a new session, and (ii) the template manager thereof executes a specific template connected to the predetermined port and requests the proxy application to execute a specific application to be connected with the specific template, the proxy application executes the requested specific application and establishes the new session for allowing the executed specific application to be connected with the specific template through the predetermined port after the proxy application asks the proxy manager whether the predetermined port is available and then receives a reply from the proxy manager that it is available.

11. A method for a mobile terminal to communicate with an accessory apparatus, comprising steps of:
(a) the mobile terminal to establish a basic connection between itself and the accessory apparatus which use an accessory protocol through its communication port; and
(b) the mobile terminal allowing each of multiple applications executed or executable thereon to perform communications with the accessory apparatus by referring to session information corresponding to each of the applications;
wherein the mobile terminal includes a proxy application and a proxy manager, and
wherein, at the step of (a), after the template manager of the accessory apparatus requests the communications for the basic connection to the mobile terminal through a predetermined port and then transmits to the mobile terminal a fact that the accessory apparatus has been connected thereto, the proxy application tries to communicate with the template manager for the basic connection therebetween through the predetermined port and sends a list of applications to the accessory apparatus through the predetermined port on the basis of the basic connection to thereby support at least one of the applications in the list to be selected by the accessory apparatus.

12. A method for a mobile terminal to communicate with an accessory apparatus, comprising steps of:
(a) the mobile terminal to establish a basic connection between itself and the accessory apparatus which use an accessory protocol through its communication port; and
(b) the mobile terminal allowing each of multiple applications executed or executable thereon to perform communications with the accessory apparatus by referring to session information corresponding to each of the applications; and
wherein, at the step of (b), the mobile terminal receives a request for execution of a specific application to be connected with a specific template executed on the accessory apparatus and information on a specific port number allocated to the specific application from the accessory apparatus and then executes the specific application if the specific port number is available.

13. An accessory apparatus, comprising:
a communication port; and
a processor;

wherein the processor establishes a basic connection between a mobile terminal and the accessory apparatus which use an accessory protocol through the communication port, and wherein the processor allows each of multiple templates executed or executable on the accessory apparatus to perform communications with the mobile terminal by referring to session information corresponding to each of the templates; and wherein the processor adds session information corresponding to a specific template among the multiple templates to a first packet to be transmitted from the specific template to the mobile terminal and transmits a second packet received from the mobile terminal to the specific template if the second packet has session information corresponding to the specific template.

14. The accessory apparatus of claim 13, wherein the processor allows each of the multiple templates to communicate with each application selected among multiple applications executed on the mobile terminal by referring to each piece of the session information.

15. An accessory apparatus, comprising:
a communication port; and
a processor;
wherein the processor establishes a basic connection between a mobile terminal and the accessory apparatus which use an accessory protocol through the communication port, and wherein the processor allows each of multiple templates executed or executable on the accessory apparatus to perform communications with the mobile terminal by referring to session information corresponding to each of the templates;

wherein the processor includes a template manager and a session manager, and wherein, after (i) the session manager allocates a predetermined port if the template manager requests an available port to the session manager to make a new session, and (ii) the template manager executes a specific template connected to the predetermined port and requests a proxy application of the mobile terminal to execute a specific application to be connected with the specific template, the proxy application is supported to execute the requested specific application and establish the new session for allowing the executed specific application to be connected with the specific template through the predetermined port.

16. An accessory apparatus, comprising:
a communication port; and
a processor;
wherein the processor establishes a basic connection between a mobile terminal and the accessory apparatus which use an accessory protocol through the communication port, and wherein the processor allows each of multiple templates executed or executable on the accessory apparatus to perform communications with the mobile terminal by referring to session information corresponding to each of the templates;

wherein the processor includes a template manager and a session manager, and wherein, after the template manager requests the communications for the basic connection to the mobile terminal through a predetermined port and then transmits to the mobile terminal a fact that the accessory apparatus has been connected thereto, the template manager receives a list of applications from a proxy application of the mobile terminal through the predetermined port on the basis of the basic connection to thereby support at least one of the applications in the list to be selected.

17. A method for an accessory apparatus to communicate with a mobile terminal, comprising steps of:
(a) the accessory apparatus to establish a basic connection between the mobile terminal and itself which use an accessory protocol through its communication port; and
(b) the accessory apparatus allowing each of multiple templates executed or executable thereon to perform communications with the mobile terminal by referring to session information corresponding to each of the templates; and wherein, at the step of (b), the accessory apparatus adds session information corresponding to a specific template among the multiple templates to a first packet to be transmitted from the specific template to the mobile terminal and transmits a second packet received from the mobile terminal to the specific template if the second packet has session information corresponding to the specific template.

18. The method of claim 17, wherein, at the step of (b), the accessory apparatus allows each of the multiple templates to communicate with each application selected among multiple applications executed on the mobile terminal by referring to each piece of the session information.

19. A method for an accessory apparatus to communicate with a mobile terminal, comprising steps of:
(a) the accessory apparatus to establish a basic connection between the mobile terminal and itself which use an accessory protocol through its communication port; and
(b) the accessory apparatus allowing each of multiple templates executed or executable thereon to perform communications with the mobile terminal by referring to session information corresponding to each of the templates;

wherein the processor includes a template manager and a session manager, and wherein, at the step of (b), after (i) the session manager allocates a predetermined port if the template manager requests an available port to the session manager to make a new session, and (ii) the template manager executes a specific template connected to the predetermined port and requests a proxy application of the mobile terminal to execute a specific application to be connected with the specific template, the proxy application is supported to execute the requested specific application and establish the new session for allowing the executed specific application to be connected with the specific template through the predetermined port.

20. A method for an accessory apparatus to communicate with a mobile terminal, comprising steps of:
(a) the accessory apparatus to establish a basic connection between the mobile terminal and itself which use an accessory protocol through its communication port; and
(b) the accessory apparatus allowing each of multiple templates executed or executable thereon to perform communications with the mobile terminal by referring to session information corresponding to each of the templates;

wherein the processor includes a template manager and a session manager, and wherein, at the step of (a), after the template manager requests the communications for the basic connection to the mobile terminal through a predetermined port and then transmits to the mobile terminal a fact that the accessory apparatus has been connected thereto, the template manager receives a list of applications from a proxy application of the mobile terminal through the predetermined port on the basis of the basic connection to thereby support at least one of the applications in the list to be selected.

* * * * *